United States Patent
Djebara et al.

(10) Patent No.: US 9,269,499 B2
(45) Date of Patent: Feb. 23, 2016

(54) THIN WIRE/THICK WIRE LEAD ASSEMBLY FOR ELECTROLYTIC CAPACITOR

(71) Applicant: AVX Corporation, Fountain Inn, SC (US)

(72) Inventors: Lotfi Djebara, Paris (FR); Stanislav Zednicek, Lanskroun (CZ); Ivan Horacek, Lanskroun (CZ); Jan Petrzilek, Usti nad Orlici (CZ)

(73) Assignee: AVX Corporation, Fountain Inn, SC (US)

( * ) Notice: Subject to any disclaimer, the term of this patent is extended or adjusted under 35 U.S.C. 154(b) by 245 days.

(21) Appl. No.: 13/972,987

(22) Filed: Aug. 22, 2013

(65) Prior Publication Data

US 2015/0055277 A1     Feb. 26, 2015

(51) Int. Cl.
| | |
|---|---|
| H01G 9/048 | (2006.01) |
| H01G 9/15 | (2006.01) |
| H01G 9/00 | (2006.01) |
| H01G 9/012 | (2006.01) |
| H01G 9/052 | (2006.01) |

(52) U.S. Cl.
CPC .............. *H01G 9/15* (2013.01); *H01G 9/0029* (2013.01); *H01G 9/012* (2013.01); *H01G 9/052* (2013.01); *Y10T 29/417* (2015.01)

(58) Field of Classification Search
USPC ......... 361/528, 523–525, 529, 532–533, 538, 361/540, 530, 531
See application file for complete search history.

(56) References Cited

U.S. PATENT DOCUMENTS

| | | | |
|---|---|---|---|
| 3,345,545 A | 10/1967 | Bourgault et al. | |
| 4,945,452 A | 7/1990 | Sturmer et al. | |
| 5,111,327 A | 5/1992 | Blohm et al. | |
| 5,457,862 A | 10/1995 | Sakata et al. | |
| 5,473,503 A | 12/1995 | Sakata et al. | |
| 5,729,428 A | 3/1998 | Sakata et al. | |
| 5,812,367 A | 9/1998 | Kudoh et al. | |
| 5,949,639 A | 9/1999 | Maeda et al. | |
| 6,191,936 B1 | 2/2001 | Webber et al. | |
| 6,197,252 B1 | 3/2001 | Bishop et al. | |

(Continued)

FOREIGN PATENT DOCUMENTS

| | | |
|---|---|---|
| WO | WO 98/49356 | 11/1998 |
| WO | WO 2005/106905 A1 | 11/2005 |
| WO | WO 2006/057455 A1 | 6/2006 |

OTHER PUBLICATIONS

Abstract of Japanese Patent—JPH088143, Jan. 12, 1996, 2 pages.

(Continued)

*Primary Examiner* — Nguyen T Ha
(74) *Attorney, Agent, or Firm* — Dority & Manning, P.A.

(57) ABSTRACT

A capacitor containing a solid electrolytic capacitor element including a sintered porous anode body, a first anode lead, and a second anode lead is provided. The first anode lead has a thickness that is larger than a thickness of the second anode lead. A portion of the first anode lead is embedded in the porous anode body, and a second portion of the first anode lead extends from a surface thereof in a longitudinal direction. Meanwhile, the second anode lead is electrically connected to the anode body for connection to an anode termination. In one embodiment, the second anode lead can be directly connected to a surface of the anode body. In another embodiment, the second anode lead can be indirectly connected to the anode body such as via attachment at an end of the second portion of the first anode lead.

30 Claims, 8 Drawing Sheets

(56) References Cited

U.S. PATENT DOCUMENTS

| | | |
|---|---|---|
| 6,322,912 B1 | 11/2001 | Fife |
| 6,391,275 B1 | 5/2002 | Fife |
| 6,416,730 B1 | 7/2002 | Fife |
| 6,447,570 B1 | 9/2002 | Pozdeev-Freeman |
| 6,527,937 B2 | 3/2003 | Fife |
| 6,576,099 B2 | 6/2003 | Kimmel et al. |
| 6,592,740 B2 | 7/2003 | Fife |
| 6,635,729 B1 | 10/2003 | Groenendaal et al. |
| 6,639,787 B2 | 10/2003 | Kimmel et al. |
| 6,665,172 B1 | 12/2003 | Kim et al. |
| 6,674,635 B1 | 1/2004 | Fife et al. |
| 6,987,663 B2 | 1/2006 | Merker et al. |
| 7,116,548 B2 | 10/2006 | Satterfield, Jr. et al. |
| 7,220,397 B2 | 5/2007 | Kimmel et al. |
| 7,262,511 B2 | 8/2007 | Osako et al. |
| 7,341,705 B2 | 3/2008 | Schnitter |
| 7,359,181 B2 | 4/2008 | Kuriyama |
| 7,381,396 B2 | 6/2008 | Thomas et al. |
| 7,419,926 B2 | 9/2008 | Schnitter et al. |
| 7,515,396 B2 | 4/2009 | Biler |
| 7,594,937 B2 | 9/2009 | Amita et al. |
| 7,787,235 B2 | 8/2010 | Fujita et al. |
| 7,929,274 B2 * | 4/2011 | Reed et al. .................. 361/528 |
| 8,066,783 B2 | 11/2011 | Takeda |
| 8,313,538 B2 | 11/2012 | Merker et al. |
| 8,482,902 B2 | 7/2013 | Ishida et al. |
| 8,630,084 B2 | 1/2014 | Saida et al. |
| 2005/0237698 A1 | 10/2005 | Postage et al. |
| 2009/0103243 A1 | 4/2009 | Mizukoshi et al. |

OTHER PUBLICATIONS

Related U.S. Applications Form.
Abstract of Japanese Patent—JPH0722289 A, Jan. 24, 1995, 2 pages.
Abstract of Japanese Patent—JPS5718317 A, Jan. 30, 1982, 1 page.
Abstract of Japanese Patent—JP2000012387 A, Jan. 14, 2000, 2 pages.
Abstract of Japanese Patent—JP2003229327 A, Aug. 15, 2003, 2 pages.
Abstract of Japanese Patent—JP2004253501 A, Sep. 9, 2004, 1 page.
Abstract of Japanese Patent—JP2004281619 A, Oct. 7, 2004, 1 page.
Abstract of Japanese Patent—JP2005033097 A, Feb. 3, 2005, 2 pages.
Abstract of Japanese Patent—JP2006295075 A, Oct. 26, 2006, 1 page.
Abstract of Japanese Patent—JP2008187091 A1, Aug. 14, 2008, 2 pages.
Abstract of Japanese Patent—JP2008305824 A, Dec. 18, 2008, 2 pages.
Abstract of Japanese Patent—JP2009266931 A, Nov. 12, 2009, 2 pages.
Hintz et al., "Anode Lead Wire Pre-Treatments for Improved Lead Wire Bonding in Tantalum Capacitor Anodes Processed by De-Oxidation/Sintering," CARTS USA, Mar. 15-18, 2010, New Orleans, Louisiana, 13 pages.
Vasina et al., "Failure Modes of Tantalum Capacitors Made by Different Technologies," CARTS USA, Mar./Apr. 2001, 6 pages.

* cited by examiner

US 9,269,499 B2

THIN WIRE/THICK WIRE LEAD ASSEMBLY FOR ELECTROLYTIC CAPACITOR

BACKGROUND OF THE INVENTION

Solid electrolytic capacitors (e.g., tantalum capacitors) have been a major contributor to the miniaturization of electronic circuits and have made possible the application of such circuits in extreme environments. The anode of a typical solid electrolytic capacitor includes a porous anode body, with an anode lead extending beyond the anode body and connected to an anode termination of the capacitor. The anode can be formed by first pressing a tantalum powder into a pellet that is then sintered to create fused connections between individual powder particles. One problem with many conventional solid electrolytic capacitors is that the small particle size of the tantalum particles can decrease the volumetric contact between the anode body and the anode lead. In fact, it can be difficult to find many points of contact between the anode lead and the powder particles. When the contact area between the anode body and the anode lead is decreased, there is a corresponding increase in resistance where the anode lead and the anode meet. This increased equivalent series resistance (ESR) results in a capacitor exhibiting decreased electrical capabilities. On the other hand, as the diameter of an anode lead is increased, the internal resistance in the anode lead itself increases, and this increase in internal resistance can counteract any improvement (decrease) in ESR seen as the result of increasing the points of contact between the anode body and the anode lead.

As such, a need currently exists for an improved solid electrolytic capacitor that finds a balance between the benefit of increased points of contact between the anode body and the anode lead without the negative effects of increased resistance in the lead itself as its diameter increases, thereby significantly improving electrical capabilities of the capacitor by achieving ultralow ESR levels.

SUMMARY OF THE INVENTION

In accordance with one embodiment of the present invention, a solid electrolytic capacitor is disclosed that comprises a capacitor element. The capacitor element comprises a sintered, porous anode body; a first anode lead; a second anode lead; a dielectric layer overlying the sintered porous anode body; and a cathode overlying the dielectric layer that includes a solid electrolyte. A first portion of the first anode lead is embedded within the porous anode body and a second portion of the first anode lead extends from a surface of the porous anode body in a longitudinal direction. Further, the second anode lead is positioned external to the porous anode body.

In accordance with another embodiment of the present invention, a method for forming a solid electrolytic capacitor comprising a sintered, porous anode body is disclosed. The method comprises positioning a first portion of a first anode lead within a powder formed from a valve metal composition such that a second portion of the first anode lead extends from a surface of the anode body in a longitudinal direction; compacting the powder around the first portion of the first anode lead; sintering the compacted powder and the first portion of the first anode lead to form the porous anode body; positioning a second anode lead external to the porous anode body; and welding the second anode lead to an anode termination to form an electrical connection between the second anode lead and the anode termination.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
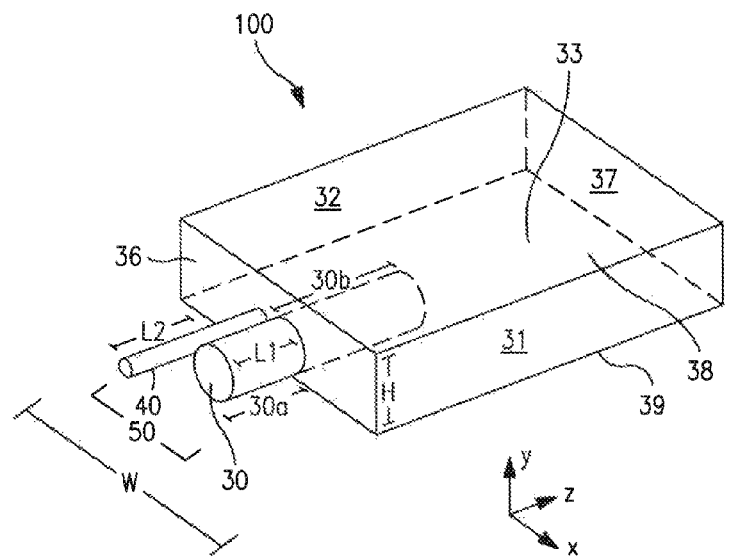
FIG. 1 is a perspective view of one embodiment of the electrolytic capacitor element of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended to limit the broader aspects of the present invention. Generally speaking, the present invention is directed to a solid electrolytic capacitor containing a capacitor element that includes a sintered porous anode body, a dielectric layer overlying the sintered porous anode body, and a cathode overlying the dielectric layer that includes a solid electrolyte. The capacitor element also includes an anode lead assembly that contains a first anode lead and a second anode lead.

In one embodiment, the first anode lead can have a thickness that can be larger than a thickness of the second anode lead, such as when the first anode lead and second anode lead are both made of tantalum. For instance, the first anode lead can have a thickness/diameter of from about 100 micrometers to about 2000 micrometers, while the second anode lead can have a thickness/diameter of from about 10 micrometers to about 1800 micrometers. In addition, the second anode lead can have a thickness/diameter that is from about 10% to about 90% of the thickness/diameter of the first anode lead. Meanwhile, in other embodiments, the first anode lead and the second anode lead can have generally the same thickness, or the second anode lead can have a thickness that is larger or smaller than the thickness of the first anode lead, such as when the first anode lead is made of tantalum and the second anode lead is made of a non-tantalum material (e.g., stainless steel, nickel, or a nickel-iron alloy). The thickness of the non-tantalum material depends on the particular non-tantalum material selected and its melting point. For instance, the first anode lead and the second anode lead can each have a thickness/diameter of from about 100 micrometers to about 2000 micrometers; the first anode lead can have a thickness/diameter of from about 100 micrometers to about 2000 micrometers, while the second anode lead can have a thickness/diameter of from about 100 micrometers to about 2500 micrometers; or the first anode lead can have a thickness/diameter of from about 100 micrometers to about 2000 micrometers, while the second anode lead can have a thickness/diameter of from about 10 micrometers to about 1800 micrometers.

Regardless of the diameters of the first and second anode lead wires, a portion of the first anode lead is embedded in the porous anode body, and a second portion of the first anode lead extends from a surface thereof in a longitudinal direction. Meanwhile, the second anode lead is electrically connected to the anode body for connection to an anode termination. In one embodiment, the second anode lead can be directly connected to a surface of the anode body. In another embodiment, the second anode lead can be indirectly connected to the anode body such as via attachment at an end of the second portion of the first anode lead.

The present inventors have found that when the first anode lead has a larger thickness/diameter than the second anode lead, the area of contact between the embedded portion of the first anode lead and the anode body is increased, thus reducing ESR by decreasing the resistance at the points of contact between the anode lead and the anode body. However, as the thickness/diameter of an anode lead increases, the internal resistance of the anode lead also increases. In order to reduce the impact of the increased internal resistance of the first anode lead resulting from the increase in the thickness/diameter of the first anode lead, the length of the external (second) portion of the first anode lead is minimized and a second anode lead utilizing a smaller diameter is used as a carrier wire during processing and also for connection to the anode termination. The second portion of the first anode lead can have a length of from about 0 micrometers to about 5000 micrometers, while the second anode lead can have a length of from about 1 micrometer to about 20 millimeters. With such a two anode lead configuration, the present inventors have found that the ESR of the resulting capacitor can be reduced.

Further, by connecting the second anode lead to the anode termination, such as when the second anode lead extends from an end of the second portion of the first anode lead, less energy can be used during laser welding due to the reduced thickness/diameter of the second anode lead compared to the first anode lead. Further, the use of a smaller diameter second anode lead facilitates the use of laser welding when a larger diameter first anode lead is used, where the diameter of the first anode lead is so large that successful laser welding of the first anode lead to an anode termination would not be possible. In addition, the ease with which the second anode lead is connected to the anode termination via resistance welding can also be improved. Meanwhile, if conductive adhesives are utilized to make the connection to the anode termination, a lesser amount of adhesive can be used due to the smaller thickness/diameter of the second anode lead as compared to the first anode lead. Also, by utilizing a second anode lead having a smaller thickness/diameter than the first anode lead, other processing steps can be simplified because a lead having a smaller thickness/diameter is easier to manipulate than a lead having a larger thickness/diameter, and the overall stability of the anode lead assembly can be increased because there is less risk that the second anode lead will bend due to its smaller thickness/diameter when compared to the first anode lead. Moreover, using a second anode lead having a smaller thickness/diameter to carry the anodes during chemical processes such as anodization and cathode buildup reduces material costs, as a portion of the second anode lead (e.g., carrier wire) is eventually trimmed away from the capacitor itself and is not needed as a component of the final capacitor product.

On the other hand, as discussed above, the present inventors have also found that utilizing a second anode lead that is made from a material that is different from the first anode lead can reduce the costs associated with forming the capacitors of the present disclosure, such as when the first anode lead is made of tantalum and the second anode lead is made of stainless steel, nickel, or a nickel-iron alloy. In such embodiments, the second anode lead can have the same thickness/diameter or the second anode lead can have a thickness/diameter that is either larger or smaller than the thickness/diameter the first anode lead, which can be made of tantalum. In such embodiments, using a non-tantalum second anode lead to carry the anodes during chemical processes such as anodization and cathode buildup can reduce material costs. For instance, as a portion of the second anode lead (e.g., carrier wire) is eventually trimmed away from the capacitor itself and is not needed as a component of the final capacitor product, a less expensive material can be used as compared to the first anode lead.

Various embodiments of the present invention will now be described in more detail.

I. Anode

The porous anode body is typically formed from a valve metal composition having a high specific charge, such as about 2,000 μF*V/g or more, in some embodiments about 5,000 μF*V/g or more, in some embodiments about 10,000 μF*V/g or more. For instance, such powders can have a specific charge of from about 10,000 to about 600,000 μF*V/g, in some embodiments from about 40,000 to about 500,000 μF*V/g, in some embodiments from about 70,000 to about 400,000 μF*V/g, in some embodiments from about 100,000 to about 350,000 μF*V/g, and in some embodiments, from about 150,000 to about 300,000 μF*V/g. As is known in the art, the specific charge may be determined by multiplying capacitance by the anodizing voltage employed, and then dividing this product by the weight of the anodized electrode body.

The valve metal composition contains a valve metal (i.e., a metal that is capable of oxidation) or a valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H. C. Starck (e.g., NH175 nodular powder). Although not required, the powder may be agglomerated using any technique known in the art, such as through heat treatment. Prior to forming the powder into the shape of an anode, it may also be optionally mixed with a binder and/or lubricant to ensure that the particles adequately adhere to each other when pressed to form the anode body. The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

Figure 4:
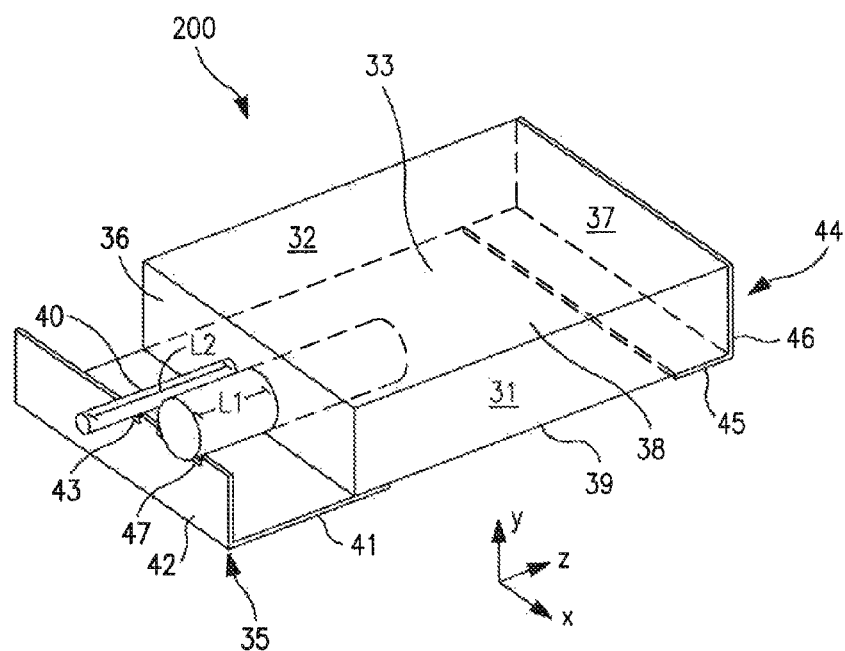
FIG. 4 is a perspective view of an electrolytic capacitor of the present invention that incorporates the capacitor element of FIGS. 1-3.

Regardless of its particular composition, the powder is compacted around a first portion 30a of a first anode lead 30 so that a second portion 30b of the first anode lead 30 extends from the compacted porous anode body 33, as shown in FIGS. 1 and 4 and as will be discussed in more detail below. In one particular embodiment, a press mold may be employed that includes a die having two or more portions (e.g., upper and lower portions). During use, the portions of the die may be placed adjacent to each other so that their walls are substantially aligned to form a die cavity having the desired shape of the anode. Before, during, and/or after loading a certain quantity of powder into the die cavity, the first anode lead 30 may be embedded therein. The die may define a single or multiple slots that allow for the insertion of the anode lead. After filling the die with powder and embedding the first anode lead therein, the die cavity may then be closed and subjected to compressive forces by a punch. Typically, the compressive forces are exerted in a direction that is either generally parallel or generally perpendicular to the length of the first anode lead, which extends along a longitudinal axis (i.e., the z-axis in FIGS. 1 and 4). This forces the particles into close contact with the first anode lead and creates a strong lead-to-powder bond.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the porous anode body is sintered to form a porous, integral mass. The pellet is typically sintered at a temperature of from about 1200° C. to about 2000° C., in some embodiments from about 1300° C. to about 1900° C., and in some embodiments, from about 1500° C. to about 1800° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

In the particular embodiments shown in FIGS. 1-8, the sintered, porous anode body 33 is in the shape of a rectangular pellet. In addition to having a rectangular shape, however, the anode can have a cubed, cylindrical, circular, or any other geometric shape. The anode may also be "fluted" in that it may contain one or more furrows, grooves, depressions, or indentations to increase the surface to volume ratio to minimize ESR and extend the frequency response of the capacitor. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

II. Dielectric

A dielectric also overlies or coats the anode body. The dielectric may be formed by anodically oxidizing ("anodizing") the sintered anode so that a dielectric layer is formed over and/or within the anode body. For example, a tantalum (Ta) anode body may be anodized to tantalum pentoxide ($Ta_2O_5$). Typically, anodization is performed by initially applying a solution to the anode body, such as by dipping the anode body into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode body. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode body and within its pores.

Although not required, in certain embodiments, the dielectric layer may possess a differential thickness throughout the anode body in that it possesses a first portion that overlies an external surface of the anode body and a second portion that overlies an interior surface of the anode body. In such embodiments, the first portion is selectively formed so that its thickness is greater than that of the second portion. It should be understood, however, that the thickness of the dielectric layer need not be uniform within a particular region. Certain portions of the dielectric layer adjacent to the external surface may, for example, actually be thinner than certain portions of the layer at the interior surface, and vice versa. Nevertheless, the dielectric layer may be formed such that at least a portion of the layer at the external surface has a greater thickness than at least a portion at the interior surface. Although the exact difference in these thicknesses may vary depending on the particular application, the ratio of the thickness of the first portion to the thickness of the second portion is typically from about 1.2 to about 40, in some embodiments from about 1.5 to about 25, and in some embodiments, from about 2 to about 20.

To form a dielectric layer having a differential thickness, a multi-stage process is generally employed. In each stage of the process, the sintered anode body is anodically oxidized ("anodized") to form a dielectric layer (e.g., tantalum pentoxide). During the first stage of anodization, a relatively small forming voltage is typically employed to ensure that the desired dielectric thickness is achieved for the inner region, such as forming voltages ranging from about 1 to about 90 volts, in some embodiments from about 2 to about 50 volts, and in some embodiments, from about 5 to about 20 volts. Thereafter, the sintered body may then be anodically oxidized in a second stage of the process to increase the thickness of the dielectric to the desired level. This is generally accomplished by anodizing in an electrolyte at a higher voltage than employed during the first stage, such as at forming voltages ranging from about 50 to about 350 volts, in some embodiments from about 60 to about 300 volts, and in some embodiments, from about 70 to about 200 volts. During the first and/or second stages, the electrolyte may be kept at a temperature within the range of from about 15° C. to about 95° C., in some embodiments from about 20° C. to about 90° C., and in some embodiments, from about 25° C. to about 85° C.

The electrolytes employed during the first and second stages of the anodization process may be the same or different. Typically, however, it is desired to employ different solutions to help better facilitate the attainment of a higher thickness at the outer portions of the dielectric layer. For example, it may be desired that the electrolyte employed in the second stage has a lower ionic conductivity than the electrolyte employed in the first stage to prevent a significant amount of oxide film from forming on the internal surface of anode body. In this regard, the electrolyte employed during the first stage may contain an acidic compound, such as hydrochloric acid, nitric acid, sulfuric acid, phosphoric acid, polyphosphoric acid, boric acid, boronic acid, etc. Such an electrolyte may have an electrical conductivity of from about 0.1 to about 100 mS/cm, in some embodiments from about 0.2 to about 20 mS/cm, and in some embodiments from about 1 to about 10 mS/cm, determined at a temperature of 25° C. The electrolyte employed during the second stage typically contains a salt of a weak acid so that the hydronium ion concentration increases in the pores as a result of charge passage therein. Ion transport or diffusion is such that the weak acid anion moves into the pores as necessary to balance the electrical charges. As a result, the concentration of the principal conducting species (hydronium ion) is reduced in the establishment of equilibrium between the hydronium ion, acid anion, and undissociated acid, thus forms a poorer-conducting species. The reduction in the concentration of the conducting species results in a relatively high voltage drop in the electrolyte, which hinders further anodization in the interior while a thicker Oxide layer is being built up on the outside to a higher formation voltage in the region of continued high conductivity. Suitable weak acid salts may include, for instance, ammonium or alkali metal salts (e.g., sodium, potassium, etc.) of boric acid, boronic acid, acetic acid, oxalic acid, lactic acid, adipic acid, etc. Particularly suitable salts include sodium tetraborate and ammonium pentaborate. Such electrolytes typically have an electrical conductivity of from about 0.1 to about 20 mS/cm, in some embodiments from about 0.5 to about 10 mS/cm, and in some embodiments, from about 1 to about 5 mS/cm, determined at a temperature of 25° C.

If desired, each stage of anodization may be repeated for one or more cycles to achieve the desired dielectric thickness. Furthermore, the anode body may also be rinsed or washed with another solvent (e.g., water) after the first and/or second stages to remove the electrolyte.

III. Solid Electrolyte

The capacitor element also contains a solid electrolyte that functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

Alternatively, the solid electrolyte may be formed from one or more conductive polymer layers. The conductive polymer (s) employed in such layers are typically π-conjugated and have electrical conductivity after oxidation or reduction, such as an electrical conductivity of at least about 1 $\mu S\ cm^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

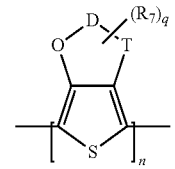

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

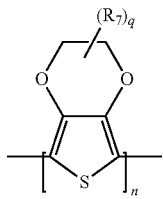

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

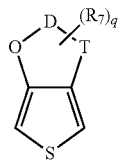

wherein,

T, D, $R_7$, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

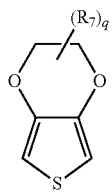

wherein, $R_7$ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are also suitable for use in the present invention. The derivatives may be made up of identical or different monomer units and used in pure form and in a mixture with one another and/or with the monomers. Oxidized or reduced forms of these precursors may also be employed.

The thiophene monomers are chemically polymerized in the presence of an oxidative catalyst. The oxidative catalyst typically includes a transition metal cation, such as iron(III), copper(II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the anode part. Suitable application techniques that may include screen-printing, dipping, electrophoretic coating, and spraying may be used to form a conductive polymer coating. As an example, the monomer may initially be mixed with the oxidative catalyst to form a precursor solution. Once the mixture is formed, it may be applied to the anode part and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer.

Polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729, 428 to Sakata, et al., and U.S. Pat. No. 5,812,367 to Kudoh, et al., which are incorporated herein in their entirety by reference thereto for all purposes.

In addition to in situ application, a conductive polymer layer may also be applied in the form of a dispersion of conductive polymer particles. Although the particle size may vary, it is typically desired that the particles possess a small diameter to increase the surface area available for adhering to the anode part. For example, the particles may have an average diameter of from about 1 nanometer to about 500 nanometers, in some embodiments from about 5 nanometers to about 400 nanometers, and in some embodiments, from about 10 nanometers to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymer into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers to about 50 micrometers, in some embodiments from about 0.5 micrometers to about 20 micrometers, and in some embodiments, from about 1 micrometers to about 5 micrometers. It should be understood that the thickness of the coating is not necessarily the same at all locations on the anode part. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

IV. External Polymer Coating

Although not required, an external polymer coating may also be applied to the anode body and overlie the solid electrolyte. The external polymer coating generally contains one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather than to impregnate the interior of the anode body, the particles used in the external coating typically have a larger size than those employed in any optional dispersions of the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 50 nanometers to about 500 nanometers, in some embodiments from about 80 nanometers to about 250 nanometers, and in some embodiments, from about 100 nanometers to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl)cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent is typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 micrometer to about 50 micrometers, in some embodiments from about 2 micrometers to about 40 micrometers, and in some embodiments, from about 5 micrometers to about 20 micrometers.

V. Other Layers of the Capacitor

If desired, the capacitor may contain other layers in addition to the dielectric layer, solid electrolyte, etc. as is known in the art. For example, a protective coating may optionally be formed between the dielectric and solid electrolyte, such as one made of a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about $1 \times 10^5$ Ω·cm, and in some embodiments, greater than about $1 \times 10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

VI. Anode Lead Assembly

As discussed above, the electrolytic capacitor of the present invention includes a first anode lead and a second anode lead that form an anode lead assembly. The first and second anode leads may be formed from any electrically conductive material, such as tantalum, niobium, nickel, aluminum, hafnium, titanium, stainless steel, etc., as well as alloys, oxides, and/or nitrides of thereof. It should be understood that it is not required that the first and second anode leads be formed from the same material (e.g., tantalum). For instance, in some embodiments, the first anode lead can be tantalum and the second anode lead can be a stainless steel, nickel, or a nickel alloy. In one particular embodiment, the second anode lead is NILO®, which is a nickel-iron alloy. The first and second anode leads may possess any desired cross-sectional shape, such as circular, elliptical, square, rectangular, etc. Further, only one of the leads need be embedded within the porous anode body, and only one of the leads need be directly connected to an anode termination. For example, the first anode lead can have a first portion that is embedded within the porous anode body and a second portion that extends from a surface thereof in a longitudinal direction. Meanwhile, the second anode lead is not embedded within the porous anode body and can be used in forming a connection to an anode termination.

Moreover, regardless of whether or not the first anode lead and the second anode lead are formed form the same or different materials, the first anode lead can have a larger thickness/diameter than the second anode lead to improve the bonding between the first anode lead and the particles of the anode body, which can result in a lower ESR, while the second anode lead can have a smaller thickness/diameter than the first anode lead to reduce the internal resistance of the overall anode lead assembly, which can also result in a lower ESR. Thus, the combination of the larger diameter first anode lead and the smaller diameter second anode lead synergistically reduces the ESR of the capacitor. For instance, because the first portion of the first anode lead is embedded within the anode body and has a larger diameter to increase the points of contact between the first anode lead and the anode body, the resistance at the points of contact is reduced. In addition, the second portion of the first anode lead having a large diameter can extend only a short distance from a surface of the anode body to minimize the length of the first anode lead having a larger diameter, which, in turn, can minimize the effect of the increased internal resistance in the lead due to the its larger diameter. Meanwhile, the external second anode lead which can be used to form an electrical connection with an anode termination, can have a small diameter than that of the first anode lead, which reduces the internal resistance of the second anode lead to minimize the ESR of the lead assembly extending from/external to the porous anode body. However, in some instances, it is to be understood that the first anode lead and second anode lead may also have the same thickness/diameter, or the second anode lead may have a larger thickness/diameter, such as when the first anode lead is made of tantalum and the second anode lead is made of a non-tantalum material, such as stainless steel, nickel, or a nickel-iron alloy.

As described above and shown in FIGS. 1-8, in some embodiments, such as when the first and second anode leads both include tantalum, or when the first anode lead includes tantalum and the second anode lead includes a non-tantalum material, the anode lead assembly includes a first anode lead that generally has a larger thickness/diameter than the second anode lead. Generally, the first anode lead can have a thickness/diameter D1 of from about 100 micrometers to about 2000 micrometers, such as from about 200 micrometers to about 1500 micrometers, such as from about 250 micrometers to about 1000 micrometers. Meanwhile, the second anode lead can have a thickness/diameter D2 of from about 10 micrometers to about 1800 micrometers, such as from about 50 micrometers to about 1200 micrometers, such as from about 100 micrometers to about 750 micrometers. Further, the second anode lead can have a thickness/diameter that is from about 10% to about 90% of the thickness/diameter of the first anode lead, such as from about 15% to about 85% of the thickness/diameter of the first anode lead, such as from about 20% to about 80% of the thickness/diameter of the first anode lead, such as from about 25% to about 75% of the thickness/diameter of the first anode lead.

Figure 9:
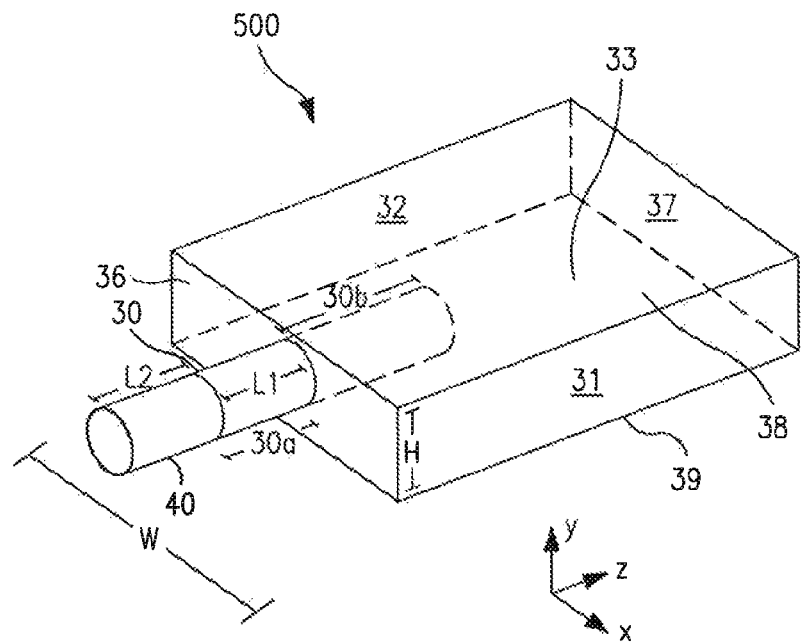
FIG. 9 is a perspective view of one embodiment of the electrolytic capacitor element of the present invention.
Figure 10:
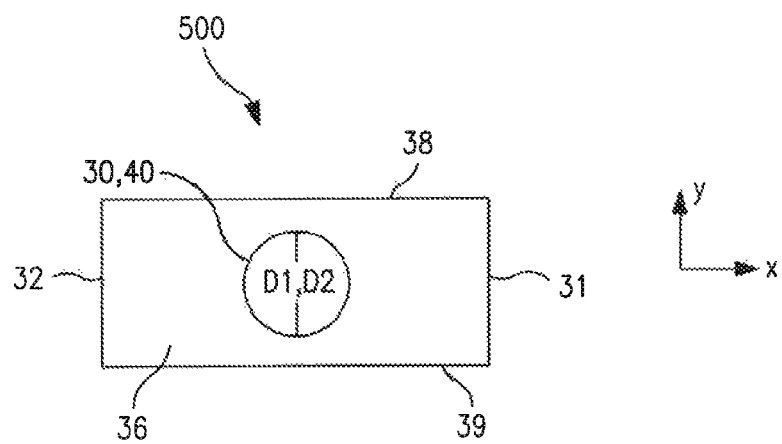
FIG. 10 is a front view of the electrolytic capacitor of FIG. 9.
Figure 11:
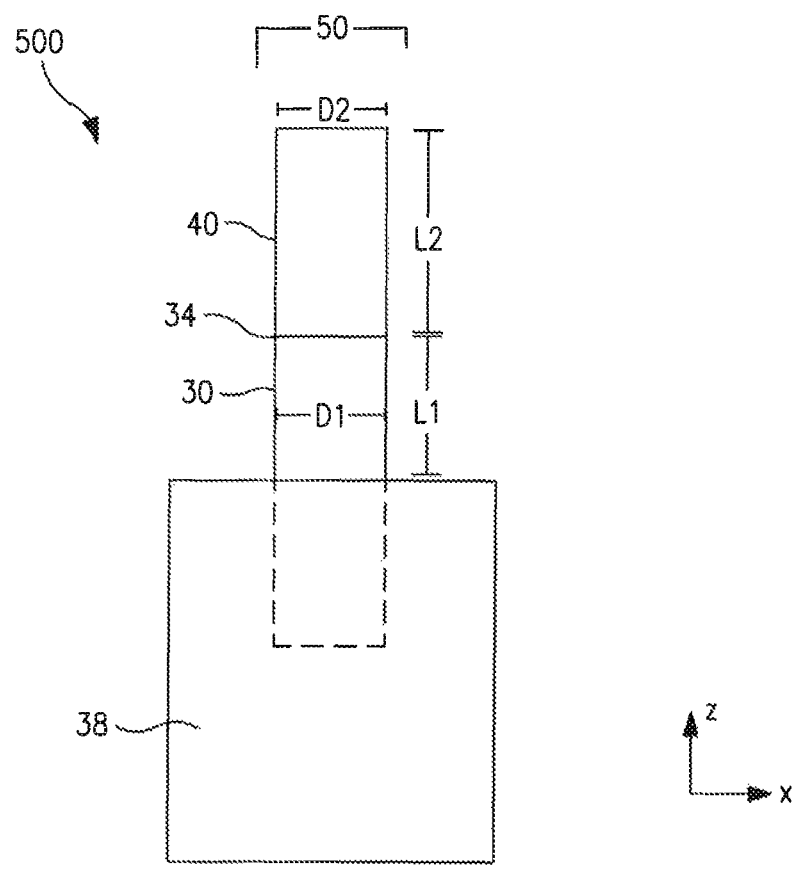
FIG. 11 is a top view of the electrolytic capacitor of FIG. 9.

Meanwhile, as shown in FIGS. 9-11, in some embodiments, such as when the first anode lead includes tantalum and the second anode lead includes a non-tantalum material, the anode lead assembly can include a first anode lead that generally has the same thickness/diameter as the second anode lead. Thus, the first anode lead and the second anode lead can have thicknesses/diameters D1 and D2 of from about 100 micrometers to about 2000 micrometers, such as from about 200 micrometers to about 1500 micrometers, such as from about 250 micrometers to about 1000 micrometers. It is to be understood, however, that in some instances, the second anode lead may also have a thickness/diameter D2 that is larger than the thickness/diameter D1 of the first anode lead, such that first anode lead can have a thickness/diameter D1 of from about 100 micrometers to about 2000 micrometers, such as from about 200 micrometers to about 1500 micrometers, such as from about 250 micrometers to about 1000 micrometers, while the second anode lead can have a thickness/diameter D2 of from about 100 micrometers to about 2500 micrometers, such as from about 205 micrometers to about 2000 micrometers, such as from about 255 micrometers micrometers to about 1500 micrometers.

Moreover, as shown in FIGS. 1, 3, 4-5, 7-8, 9, and 11, the first portion 30a of the first anode lead 30 (i.e., the portion of the first anode lead that extends from a surface of the porous anode body in a longitudinal direction) can have a length (L1) in the longitudinal (z) direction that is shorter than the length (L2) of the second anode lead 40 in the longitudinal (z) direction. The length L1 of the second portion of the first anode lead 30 is minimized to reduce the ESR of the capacitor that can be attributed to the increased internal resistance of the first anode lead 30 due to its larger diameter and to enhance the stability of the lead assembly 50 by reducing the risk of bending due to the weight of the first anode lead 30. Thus, the second portion of the first anode lead can have a length greater than 0 micrometers to about 5000 micrometers, such as from about 1 micrometer to about 2500 micrometers, such as from about 10 micrometers to about 1250 micrometers, while the second anode lead can have a length of from about 1 micrometer to about 20 millimeters, such as from about 100 micrometers to about 15 millimeters, such as from about 1000 micrometers to about 10 millimeters.

Figure 5:
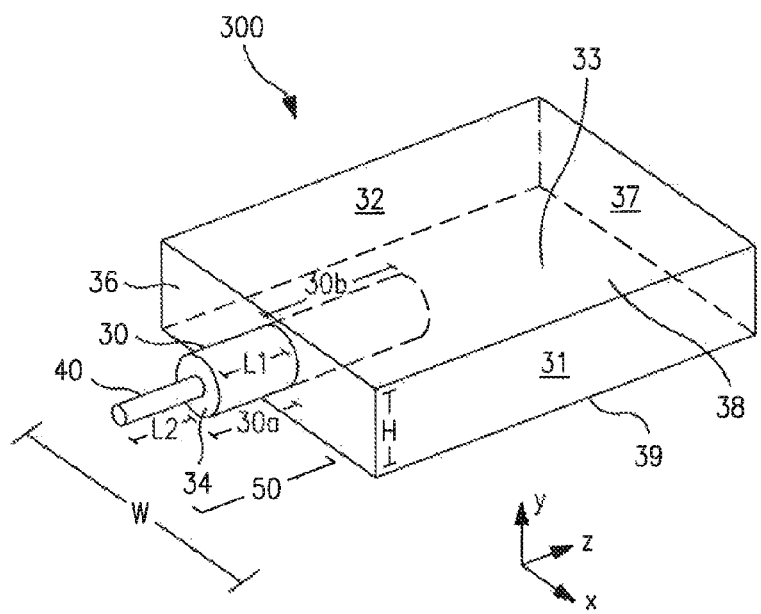
FIG. 5 is a perspective view of another embodiment of the electrolytic capacitor element of the present invention.

In addition, it should be understood that the anode lead assembly 50 can have various configurations depending on where the second anode lead is connected to the porous anode body. In one embodiment, the second anode lead can be directly connected to an exterior surface of the porous anode body such that the second anode lead is adjacent to and is in electrical contact with the second portion of the first anode lead that extends from the same surface of the porous anode body in a longitudinal direction, as shown in FIG. 1. The second anode lead can be connected to the surface of the porous anode body any suitable method such as by resistance welding, laser welding, or a conductive adhesive. In another embodiment, the second anode lead can be directly connected to the second portion of the first anode lead, such as at the end of the second portion of the first anode lead, as shown in FIG. 5, such that the second anode lead extends from the end of the second portion of the first anode lead in a longitudinal direction. The second anode lead can be connected to the end of the second portion of the first anode lead by any suitable method such as by resistance welding, laser welding, or a conductive adhesive.

VII. Terminations

Figure 8:
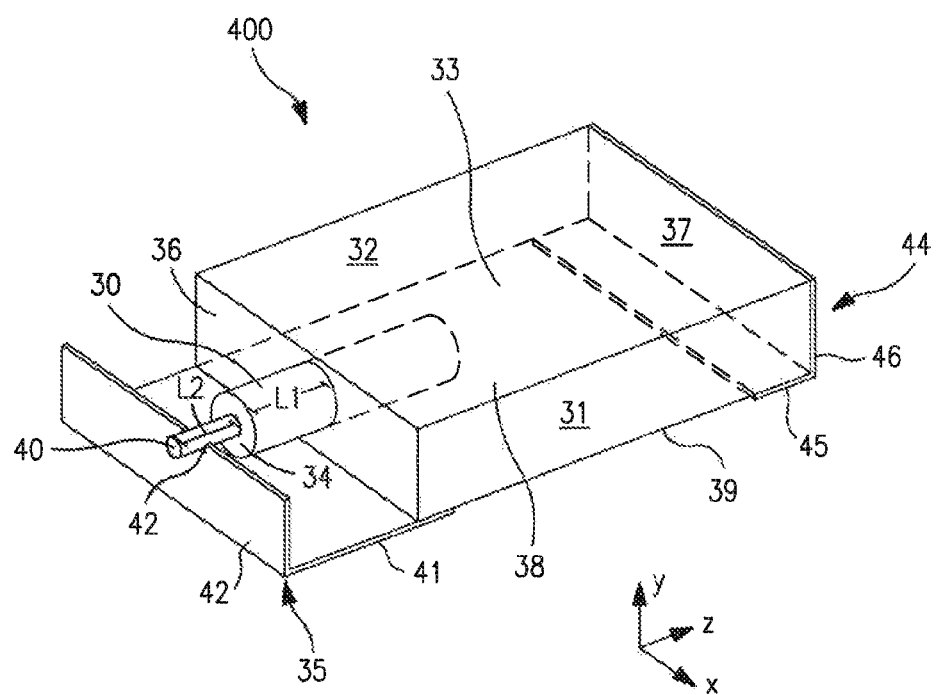
FIG. 8 is a perspective view of an electrolytic capacitor of the present invention that incorporates the capacitor element of FIGS. 5-7.

Regardless of the particular design or manner in which the capacitor is formed, it can be connected to terminations as is well known in the art. For example, anode and cathode terminations may be electrically connected to the second anode lead and the cathode, respectively. The specific configuration of the terminations may vary as is well known in the art. Although not required, in one embodiment, as shown in FIGS. 4 and 8, for example, the cathode termination 44 can contain a planar portion 45 in electrical contact with a lower surface 39 of the capacitor element and an upstanding portion 46 positioned substantially perpendicular to the planar portion 45 and in electrical contact with a rear surface 38 of the capacitor element. To attach the capacitor element to the cathode termination, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al., which is incorporated herein in its entirety by reference thereto for all purposes.

Referring again to FIGS. 4 and 8, although not required, the anode termination 35 may likewise contain a planar portion 41 and an upstanding portion 42. The upstanding portion 42 may contain a region that carries the second anode lead 40 of the present invention. For example, the region may possess a slot 43 for receiving the second anode lead 40. The slot may have any desired shape, and can be U-shaped, V-shaped, circular, rectangular, square, stepped, etc. for further enhancing surface contact and mechanical stability of the second anode lead 40 at the anode termination 35. For instance, the geometry of the slot may match the geometry of the second anode lead 40. The second anode lead 40 can be electrically connected to the anode termination 35 by any suitable technique, such as by laser welding, by resistance welding, or the use of conductive adhesives, etc. Regardless of the particular welding technique used to connect the second anode lead 40 to the anode termination 35, the amount of energy required to form a sufficient weld is reduced when compared to the amount of energy that would be required if the larger diameter first anode lead 30 was directly connected to the anode termination 35. Thus, by utilizing a smaller second anode lead 40 to serve as the direct connection to the anode termination 35, the benefit of embedding a relatively thick first anode lead 30 in the porous anode body 33 can still be realized (i.e., improved contact with the porous anode body to reduce ESR), yet the welding process to form an electrical connection with an anode termination can be carried out in a more efficient and cost-effective manner due to the reduced thickness/diameter of the second anode lead 40.

Further, once the capacitor element is formed and is attached to the terminations as discussed above, it can be enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 100 micrometers to about 2.5 millimeters, and in some embodiments, from about 150 micrometers to about 2.0 millimeters. Suitable casings may include, for instance, "A", "B", "H", or "T" cases (AVX Corporation). After encapsulation, exposed portions of the respective anode and cathode terminations may be aged, screened, and trimmed. If desired, the exposed portions may be optionally bent twice along the outside of the casing (e.g., at an approximately 90° angle).

Turning now to FIGS. 1-11, various embodiments of the solid electrolytic capacitor of the present invention are discussed in more detail.

Referring now to FIG. 1, one particular embodiment of a capacitor element 100 that is formed from a porous anode body 33 and an anode lead assembly 50 including first anode lead 30 and second anode lead 40 is shown. Generally, FIG. 1 is a perspective view of the porous anode body 33 that is formed around first anode lead 30 and shows the arrangement and dimensions of the porous anode body 33, the first anode lead 30, and the second anode lead 40. For instance, the porous anode body 33 can have a first side surface 31, a second side surface 32, a front surface 36, a rear surface 37, an upper surface 38, and a lower surface 39. The porous anode body 33 can also have a width W that can refer, for example, to the width of the front surface 36 along the x-axis, and a height H that can refer, for example, to the height or thickness of the front surface 36 along the y-axis. The width W of the front surface 36 of the porous anode body 33 can range from about 200 micrometers to about 8000 micrometers, in some embodiments, from about 400 micrometers to 6000 micrometers, and in some embodiments, from about 600 micrometers to about 4000 micrometers. Additionally, the height H of the front surface 36 of the porous anode body 33 can range from about 200 micrometers to about 8000 micrometers, in some embodiments from about 400 micrometers to about 6000 micrometers, and in some embodiments from about 600 micrometers to about 4000 micrometers.

Further, as shown in FIG. 1, the first anode lead 30 can have a first portion 30a that extends from a surface of the porous anode body 33, such as front surface 36, and a second portion 30b that is positioned within the anode body 33. The thickness/diameter of the first anode lead 30 may vary depending on the overall size of the anode body 33. In any event, the larger the thickness/diameter D1 (see FIG. 2), the larger the number of points of contact between the porous anode body 33 and the anode lead 30 along embedded second portion 30b, which results in a lower ESR and improved electrical capabilities of the capacitor. The dimensions of the first anode lead 30 are discussed in section VI above.

Figure 2:
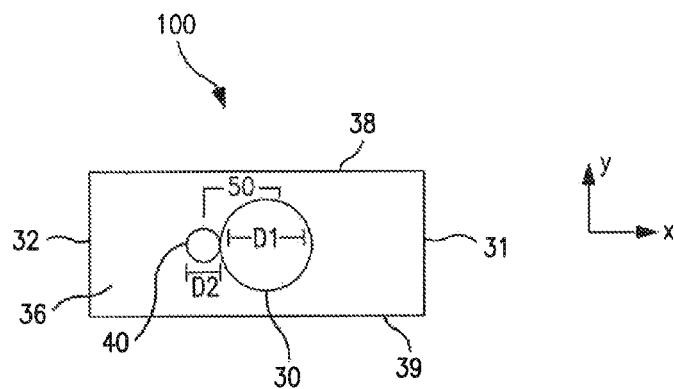
FIG. 2 is a front view of the electrolytic capacitor element of FIG. 1.
Figure 3:
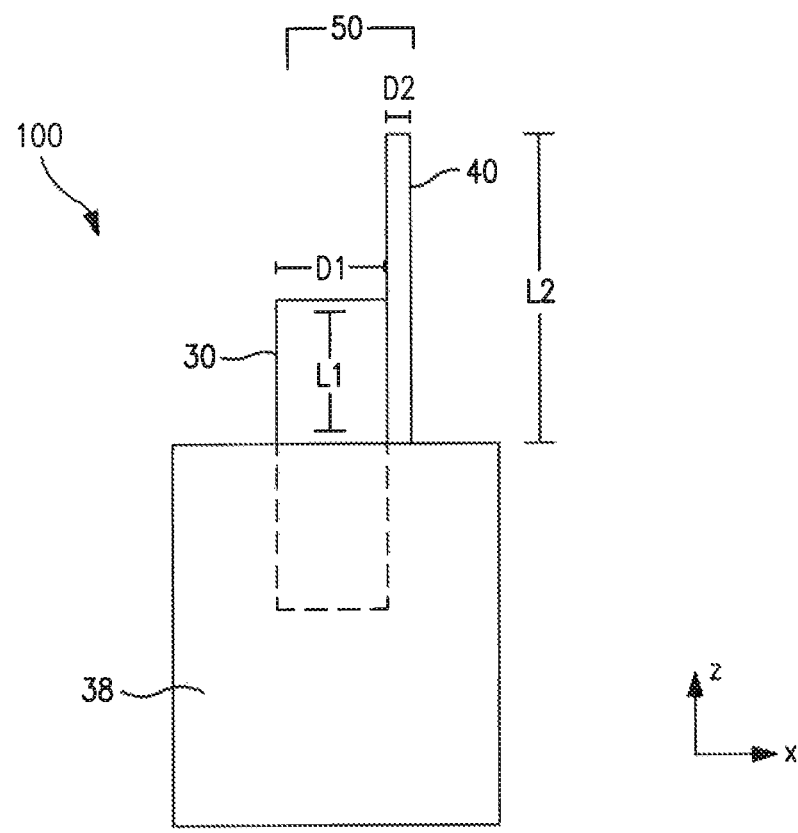
FIG. 3 is a top view of the electrolytic capacitor element of FIG. 1.

As shown in FIGS. 1-3, the first anode lead 30 extends from the front surface 36 of the porous anode body 33; however, it should be understood that the first anode lead 30 may also extend from any other surface of the porous anode body 33. Further, the first portion 30a of the first anode lead 30 that extends from a surface of the porous anode body 33 can have a thickness D1 (see FIG. 2 showing the front view of the capacitor element 100), which, as mentioned above, also refers to the thickness of the second portion 30b of the first anode lead 30 that is embedded within the porous anode body 33.

Additionally, the capacitor element 100 of FIG. 1 also includes a second anode lead 40 as part of its anode lead assembly 50. As shown, the second anode lead 40 has a thickness/diameter D2 (see FIG. 2) that is smaller than the thickness/diameter of D1. In the particular capacitor element 100 of FIG. 1, the second anode lead 40 can be connected directly to the front surface 36 of the porous anode body via any suitable method as discussed in detail above. Further, the second anode lead 40 is adjacent to and in electrical contact with the first portion 30a of the first anode lead 30, which is the portion that extends from the front surface 36 of the porous anode body in the longitudinal (z) direction, as shown in FIGS. 1-3. The dimensions of the second anode lead 40 are discussed in section VI above.

Initially, as shown in FIG. 1, the length L1 of the first portion 30a of the first anode lead 30 can be shorter than the length L2 of the second anode lead 40. The second anode lead 40 is used as a carrier wire during chemical processing, such as anodization and cathode buildup, as well as during any other phases of the assembly of the capacitor. The various ranges for the lengths of each of the anode leads are discussed in detail in section VI above, and generally the length L1 of the first portion 30a of the first anode lead 30 is less than the length L2 of the second anode lead 40 to minimize the internal resistance attributed to the first anode lead 30, which, in turn, reduces the ESR. The shorter length of the first anode lead 30 can also enhance the stability of the lead assembly 50 during processing by reducing the weight of the anode lead assembly 50, which can limit the tendency of the anode lead assembly 50 to bend compared to when a larger diameter anode lead having a longer length is utilized. Further, the amount of material required for the first anode lead 30 is reduced, which is more cost efficient. Meanwhile, the second anode lead 40, at least initially, has a length L2 that is longer than the length L1 of the first anode lead 30 so that the second anode lead 40 having a smaller diameter can be used during assembly of the capacitor 200 shown in FIG. 4. Once chemical processing and other assembly is complete, however, the second anode lead 40 can be trimmed to approximately the same length as the first anode lead 30. Then, the second anode lead 40 can be attached to the upstanding portion 42 of the anode termination 35 at notch 43 as shown in FIG. 4, while the first anode lead 30 can be attached to the upstanding portion 42 of the anode termination 35 at notch 47, as also shown in FIG. 47, such as by laser welding or resistance welding. Such a configuration as discussed above can reduce the ESR of the capacitor compared to when a single anode lead is utilized and also enables for easier processing of the capacitor element due to the smaller diameter second anode lead.

Another embodiment of the present disclosure includes the capacitor element 300 and capacitor 400 of FIGS. 5-8. The capacitor element 300 of FIGS. 5-7 has a porous anode body 33 having the same dimensions as discussed above in reference to the capacitor element 100 of FIGS. 1-3.

Further, as shown in FIG. 5, the first anode lead 30 can have a first portion 30*a* that extends from a surface of the porous anode body 33, such as front surface 36, and a second portion 30*b* that is positioned within the anode body 33. The thickness/diameter of the first anode lead 30 may vary depending on the overall size of the anode body 33. In any event, the larger the thickness/diameter D1 (see FIG. 6), the larger the number of points of contact between the porous anode body 33 and the anode lead 30 along embedded second portion 30*b*, which results in a lower ESR and improved electrical capabilities of the capacitor.

Figure 6:
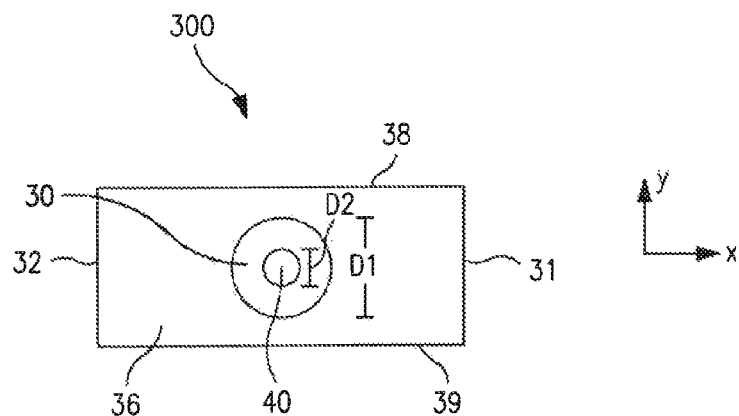
FIG. 6 is a front view of the capacitor element of FIG. 5.
Figure 7:
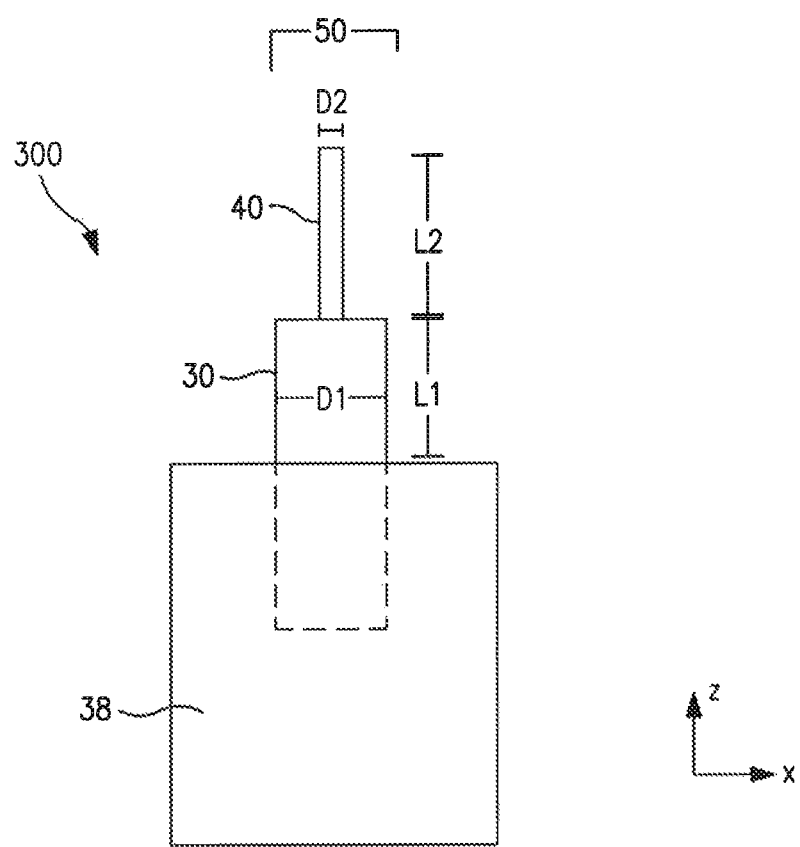
FIG. 7 is a top view of the capacitor element of FIG. 5.

As shown in FIGS. 5-7, the first anode lead 30 extends from the front surface 36 of the porous anode body 33; however, it should be understood that the first anode lead 30 may also extend from any other surface of the porous anode body 33. Further, the first portion 30*a* of the first anode lead 30 that extends from a surface of the porous anode body 33 can have a thickness D1 (see FIG. 6 showing the front view of the capacitor element 100), which, as mentioned above, also refers to the thickness of the second portion 30*b* of the first anode lead 30 that is embedded within the porous anode body 33.

Additionally, the capacitor element 300 of FIG. 5 also includes a second anode lead 40 as part of its anode lead assembly 50. As shown, the second anode lead 40 can have a thickness/diameter D2 (see FIG. 6) that is smaller than the thickness/diameter of D1. In the particular capacitor element 300 of FIG. 5, the second anode lead 40 can be connected directly to end 34 of the second portion 30*a* of the first anode lead 30 and can extend therefrom in a longitudinal (z) direction of the porous anode body via any suitable method as discussed in detail above.

Initially, the length L1 of the first portion 30*a* of the first anode lead 30 is shorter than the length L2 of the second anode lead 40, and the second anode lead 40 is used as a carrier wire during chemical processing such as anodization and cathode buildup, as well as during any other phases of the assembly of the capacitor. The various ranges for the lengths of each of the anode leads are discussed in detail above, and generally the length L1 of the first portion 30*a* of the first anode lead 30 is less than the length L2 of the second anode lead 40 to minimize the internal resistance attributed to the first anode lead 30, which, in turn, reduces the ESR. Further, the amount of material required for the first anode lead 30 is reduced, which is more cost efficient. Meanwhile, the second anode lead 40 has a length L2 that is longer so that the second anode lead 40 having a smaller diameter can be used during assembly of the capacitor 400 shown in FIG. 8 to simplify the process. After processing, however, the length L2 of the second anode lead 40 can be trimmed to any suitable length and then attached to the upstanding portion 42 of the anode termination 35 at notch 43 as shown in FIG. 8. Because the second anode lead 40 has a smaller diameter D2 than the diameter D1 of the first portion 30*a* of the first anode lead 30, the anode termination 35 can be more easily and efficiently connected to the anode lead assembly 50.

Yet another embodiment of the present disclosure includes the capacitor element 300 and capacitor 500 of FIGS. 9-11. The capacitor element 500 of FIGS. 9-11 has a porous anode body 33 having the same dimensions as discussed above in reference to the capacitor element 100 of FIGS. 1-3. However, in the embodiments of FIGS. 9-11, the first anode lead and second anode lead are formed from different materials, while this is not required in the embodiments of FIGS. 1-8.

Further, as shown in FIG. 9, the first anode lead 30 can have a first portion 30*a* that extends from a surface of the porous anode body 33, such as front surface 36, and a second portion 30*b* that is positioned within the anode body 33. The thickness/diameter of the first anode lead 30 may vary depending on the overall size of the anode body 33. In any event, the larger the thickness/diameter D1 (see FIG. 9), the larger the number of points of contact between the porous anode body 33 and the anode lead 30 along embedded second portion 30*b*, which results in a lower ESR and improved electrical capabilities of the capacitor.

As shown in FIGS. 9-11, the first anode lead 30 extends from the front surface 36 of the porous anode body 33; however, it should be understood that the first anode lead 30 may also extend from any other surface of the porous anode body 33. Further, the first portion 30*a* of the first anode lead 30 that extends from a surface of the porous anode body 33 can have a thickness D1 (see FIG. 10 showing the front view of the capacitor element 500), which, as mentioned above, also refers to the thickness of the second portion 30*b* of the first anode lead 30 that is embedded within the porous anode body 33.

Additionally, the capacitor element 500 of FIG. 9 also includes a second anode lead 40 as part of its anode lead assembly 50. As shown, the second anode lead 40 can have a thickness/diameter D2 (see FIG. 10) that is the same as the thickness/diameter of D1. In the particular capacitor element 500 of FIG. 9, the second anode lead 40 can be connected directly to end 34 of the second portion 30*a* of the first anode lead 30 and can extend therefrom in a longitudinal (z) direction of the porous anode body via any suitable method as discussed in detail above. It should be understood, however, that the second anode lead 40 can have a thickness/diameter that is larger than the thickness/diameter of the first anode lead (not shown).

Initially, the length L1 of the first portion 30*a* of the first anode lead 30 is shorter than the length L2 of the second anode lead 40, and the second anode lead 40 is used as a carrier wire during chemical processing such as anodization and cathode buildup, as well as during any other phases of the assembly of the capacitor. The various ranges for the lengths of each of the anode leads are discussed in detail above, and generally the length L1 of the first portion 30*a* of the first anode lead 30 is less than the length L2 of the second anode lead 40 to minimize the internal resistance attributed to the first anode lead 30, which, in turn, reduces the ESR. Further, the amount of material required for the first anode lead 30 is reduced, which is more cost efficient. Meanwhile, the second anode lead 40 has a length L2 that is longer so that the second anode lead 40 having a smaller diameter can be used during assembly of the capacitor 500.

As a result of the present disclosure, a capacitor may be formed that exhibits excellent electrical properties as determined by the test procedures described below. For example, the capacitor of the present invention can exhibit an ultralow ESR, such as about 300 milliohms (mΩ) or less, in some embodiments about 100 mΩ or less, in some embodiments from about 0.01 mΩ to about 50 mΩ, and in some embodiments, from about 0.1 mΩ to about 20 mΩ, determined at a frequency of 100 kHz and a temperature of 23° C.±2° C. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 µA/µF*V, in some embodiments less than about 0.01 µA/µF*V, and in some embodiments, less than about 0.001 µA/µF*V, wherein µA is microamps and uF*V is the product of the capacitance and the rated voltage.

Test Procedures

Equivalent Series Resistance ("ESR")

ESR generally refers to the extent that the capacitor acts like a resistor when charging and discharging in an electronic circuit and is usually expressed as a resistance in series with the capacitor. ESR is typically measured using a Keithley 3330 Precision LCZ meter with Kelvin Leads 2.2 volt DC bias and a 0.5 volt peak to peak sinusoidal signal, at an operating frequency of 100 kHz and temperature of 23° C.±2° C.

Capacitance ("Cap")

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current

Leakage current ("DCL") was measured using a leakage test set that measures leakage current at a temperature of 23° C.±2° C. and at the rated voltage after a minimum of 30 seconds.

Laser Weld

The laser weld was done using a Trumpf Nd:YaG HAAS laser (emitting near IR light at wavelength around 1,064 nanometers). The energy to weld generally refers to the amount of laser energy required to bond the anode lead to the anode termination/lead frame. The energy to weld is settled in Joules.

EXAMPLE 1

70,000 µFV/g tantalum powder was pressed into pellets to form a porous body having a length of 4.15 mm, a width of 3.60 mm, and a thickness of 0.95 mm. The tantalum powder was charged into the hopper of a tantalum device automatic molding machine and automatically molded together with a first tantalum wire having a diameter of 0.50 mm and pressed to a density of 5.3 g/cm$^3$ to manufacture a porous body. 70% of the overall length of the anode lead was embedded in the porous anode body. The penetration of wire in the porous was 70% of the anode length. This molded body was left standing under reduced pressure at 1400° C. to obtain a sintered body.

A second tantalum wire having a diameter of 0.24 mm tantalum wire was then welded together by a resistance welding process with the end of the portion of the first, 0.50 mm diameter wire extending from the body. Thereafter, the second, 0.24 mm diameter tantalum wire was welded to an auxiliary stainless steel strip.

The tantalum anode was anodized at 13.1 V in a liquid electrolyte of 0.1% phosphoric acid to make capacitors with 330 µF at 120 Hz. A conductive polymer coating was then formed by dipping the anode into a butanol solution of iron (III) toluenesulfonate (Clevios™ C, H. C. Starck) for 5 minutes and consequently into 3,4-ethylenedioxythiophene (Clevios™ M, H. C. Starck) for 1 minute. After 45 minutes of polymerization, a thin layer of poly(3,4-ethylenedioxythiophene) was formed on the surface of the dielectric. The anode was washed in methanol to remove reaction by-products, anodized in a liquid electrolyte, and washed again in methanol. This process was repeated 6 times. Thereafter, the part was dipped into a dispersed poly(3,4-ethylenedioxythiophene) having a solids content of 2% and viscosity of 20 mPa·s (Clevios™ K, H. C. Starck). Upon coating, the part was dried at 125° C. for 20 minutes. This process was not repeated. Thereafter, the part was dipped into a dispersed poly(3,4-ethylenedioxythiophene) having a solids content of 2% and a viscosity of 160 mPa·s (Clevios™ K, H. C. Starck). Upon coating, the part was dried at 125° C. for 20 minutes. This process was repeated 8 times. The part was then dipped into a graphite dispersion and dried. Finally, the part was dipped into a silver dispersion and dried. The finished part was completed by conventional assembly technology and then measured. A copper-based leadframe was used for finishing of the assembly process. Once the capacitor element was attached via a laser welding process to bond the anode lead wire to the anode termination, the length L2 of the second anode lead 40 was set to 0.80 mm. Next, the leadframe was enclosed with an encapsulating epoxy resin. Multiple parts (1500) of 330 µF/6.3V capacitors were made in this manner.

EXAMPLE 2

Capacitors were formed in the manner described in Example 1, except that the length L2 of the second anode lead 40 was set to 0.1 mm. Multiple parts (1500) were made in this manner.

COMPARATIVE EXAMPLE 3

Capacitors were formed in the manner described in Example 1, except that only a single lead wire with a diameter of 0.24 mm was utilized. Multiple parts (3000) were made in this manner.

COMPARATIVE EXAMPLE 4

Capacitors were formed in the manner described in Example 1, except that only a single lead wire with diameter of 0.50 mm was utilized. Multiple parts (3000) were made in this manner.

Table 1 below summarizes the characteristics of examples 1-4 discussed above, including the tantalum wire diameters, the laser weld setting, the median DCL, the median capacitance, and the median ESR of the finished capacitors.

TABLE 1

| | Ta wire diameter (anode lead 40) [mm] | Ta wire diameter (anode lead 30) [mm] | Laser Weld Energy [J] | DCL [µA] | CAP [µF] | ESR [mΩ] |
|---|---|---|---|---|---|---|
| Example 1 | 0.24 | 0.50 | 9.5 | 11.2 | 298.0 | 22.1 |
| Example 2 | 0.24 | 0.50 | 14.0 | 34.1 | 299.2 | 19.6 |
| Comparative Example 3 | — | 0.24 | 9.0 | 9.7 | 308.0 | 30.4 |
| Comparative Example 4 | — | 0.50 | 36.0 | N/A | N/A | N/A |

As shown in Table 1, the benefit of using a thin wire/thick wire anode lead assembly is for better (lower) ESR values when compared with the comparative examples using only a single lead wire. Electrical data for comparative examples 4 is not available because the laser welding process could not be completed.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor that comprises a capacitor element, the capacitor element comprising:
    a sintered, porous anode body;
    a first anode lead, wherein a first portion of the first anode lead is embedded within the porous anode body and a second portion of the first anode lead extends from a surface of the porous anode body in a longitudinal direction;
    a second anode lead, wherein the second anode lead is positioned external to the porous anode body, further wherein the second anode lead is not embedded within the porous anode body;
    a dielectric layer overlying the sintered porous anode body; and
    a cathode overlying the dielectric layer that includes a solid electrolyte.

2. The solid electrolytic capacitor of claim 1, wherein the second anode lead has a thickness that is smaller than the thickness of the first anode lead.

3. The solid electrolytic capacitor of claim 2, wherein the thickness of the second anode lead is from about 10% to about 90% of the thickness of the first anode lead.

4. The solid electrolytic capacitor of claim 2, wherein the thickness of the first anode lead is from about 100 micrometers to about 2000 micrometers.

5. The solid electrolytic capacitor of claim 2, wherein the thickness of the second anode lead is from 10 micrometers to about 1800 micrometers.

6. The solid electrolytic capacitor of claim 2, wherein the first anode lead and the second anode lead are the same material.

7. The solid electrolytic capacitor of claim 2, wherein the first anode lead and the second anode lead are different materials.

8. The solid electrolytic capacitor of claim 1, wherein the first anode lead is a different material than the second anode lead, further wherein the second anode lead has a thickness that is the same as or larger than the thickness of the first anode lead.

9. The solid electrolytic capacitor of claim 1, wherein the second anode lead is connected to the surface of the porous anode body such that the second anode lead is adjacent to and in contact with the second portion of the first anode lead.

10. The solid electrolytic capacitor of claim 9, wherein the second anode lead is connected to the surface of the porous anode body by resistance welding.

11. The solid electrolytic capacitor of claim 9, wherein the second anode lead is connected to the surface of the porous anode body by laser welding.

12. The solid electrolytic capacitor of claim 1, wherein the second anode lead is connected to the second portion of the first anode lead.

13. The solid electrolytic capacitor of claim 12, wherein the second anode lead extends beyond the second portion of the first anode lead in a longitudinal direction.

14. The solid electrolytic capacitor of claim 12, wherein the second anode lead is connected to the second portion of the first anode lead by resistance welding.

15. The solid electrolytic capacitor of claim 12, wherein the second anode lead is connected to the second portion of the first anode lead by laser welding.

16. The solid electrolytic capacitor of claim 1, wherein the anode body is formed from a powder having a specific charge of from about 10,000 $\mu F*V/g$ to about 600,000 $\mu F*V/g$, wherein the powder comprises a valve metal such as tantalum, niobium, aluminum, hafnium, titanium, an electrically conductive oxide thereof, or an electrically conductive nitride thereof.

17. The solid electrolytic capacitor of claim 1, further comprising an anode termination that is electrically connected to the second anode lead and a cathode termination that is electrically connected to the cathode.

18. A method for forming a solid electrolytic capacitor comprising a sintered, porous anode body, the method comprising:
    positioning a first portion of a first anode lead within a powder formed from a valve metal composition such that a second portion of the first anode lead extends from a surface of the anode body in a longitudinal direction;
    compacting the powder around the first portion of the first anode lead;
    sintering the compacted powder and the first portion of the first anode lead to form the porous anode body;
    positioning a second anode lead external to the porous anode body; and
    welding the second anode lead to an anode termination to form an electrical connection between the second anode lead and the anode termination.

19. The method of claim 18, wherein the second anode lead is connected to the surface of the porous anode body such that the second anode lead is adjacent to and in contact with the second portion of the first anode lead, wherein the second portion of the first anode lead is also welded to the anode termination.

20. The method of claim 19, wherein the second anode lead is welded to the surface of the porous anode body.

21. The method of claim 18, wherein the second anode lead is connected to the second portion of the first anode lead.

22. The method of claim 21, wherein the second anode lead is extends beyond the second portion of the first anode lead in a longitudinal direction.

23. The method of claim 21, wherein the second anode lead is welded to the second portion of the first anode lead.

24. The method of claim 18, further comprising trimming the second anode lead.

25. The method of claim 18, further comprising:
    anodically oxidizing the sintered, porous anode body to form a dielectric layer; and
    applying a solid electrolyte to the anodically oxidized sintered anode body to form a cathode.

26. The method of claim 25, further comprising:
    forming an electrical connection between the cathode and a cathode termination; and
    encapsulating the capacitor with a molding material such that at least a part of the anode termination and a part of the cathode termination remain exposed.

27. The method of claim 18, wherein the second anode lead has a thickness that is smaller than the thickness of the first anode lead.

28. The method of claim 27, wherein the first anode lead and the second anode lead are the same material.

29. The method of claim 27, wherein the first anode lead and the second anode lead are different materials.

30. The method of claim 18, wherein the first anode lead is a different material than the second anode lead, further wherein the second anode lead has a thickness that is the same as or larger than the thickness of the first anode lead.

* * * * *